United States Patent
Yuen et al.

(10) Patent No.: US 8,620,620 B1
(45) Date of Patent: Dec. 31, 2013

(54) METHOD FOR TESTING A CIRCUIT CARD ASSEMBLY

(75) Inventors: Keith Ng Yuen, Pasadena, CA (US); Alex Phi Bao Long Nguyen, Oxnard, CA (US); David George Omoto, Camarillo, CA (US); Jacob B. Oliver, Port Hueneme, CA (US); Michael Anthony Antonio Pascual, Camarillo, CA (US); Sean Xiao-Yun Hong, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 492 days.

(21) Appl. No.: 12/895,718

(22) Filed: Sep. 30, 2010

(51) Int. Cl.
*G06F 11/30* (2006.01)
*G01S 7/36* (2006.01)
*H04K 3/00* (2006.01)

(52) U.S. Cl.
USPC .................................. 702/183; 342/14; 455/1

(58) Field of Classification Search
USPC ............... 702/183, 57, 60–62, 64–76, 80–81, 702/84–85, 106–108, 117–124, 127, 144, 702/182, 189–190; 342/13–15, 175–176, 342/192, 200; 455/1, 73, 84–87, 205, 208; 307/106–107
See application file for complete search history.

(56) References Cited

U.S. PATENT DOCUMENTS

2004/0174075 A1* 9/2004 Bulharowski ................. 307/149

* cited by examiner

*Primary Examiner* — Toan Le
(74) *Attorney, Agent, or Firm* — Christopher L. Blackburn

(57) ABSTRACT

A method(s) of testing AN/ULQ-21 (Hydra) Circuit Card Assembly(ies) (CCAs), which involve providing software to perform automated tests on Hydra CCAs that make up the Hydra Countermeasures Set and employ commercial off the shelf equipment (such as signal generators, spectrum analyzer, Data Acquisition Device(s), oscillators, etc. as applicable depending on the test and CCA being evaluated).

16 Claims, 1 Drawing Sheet

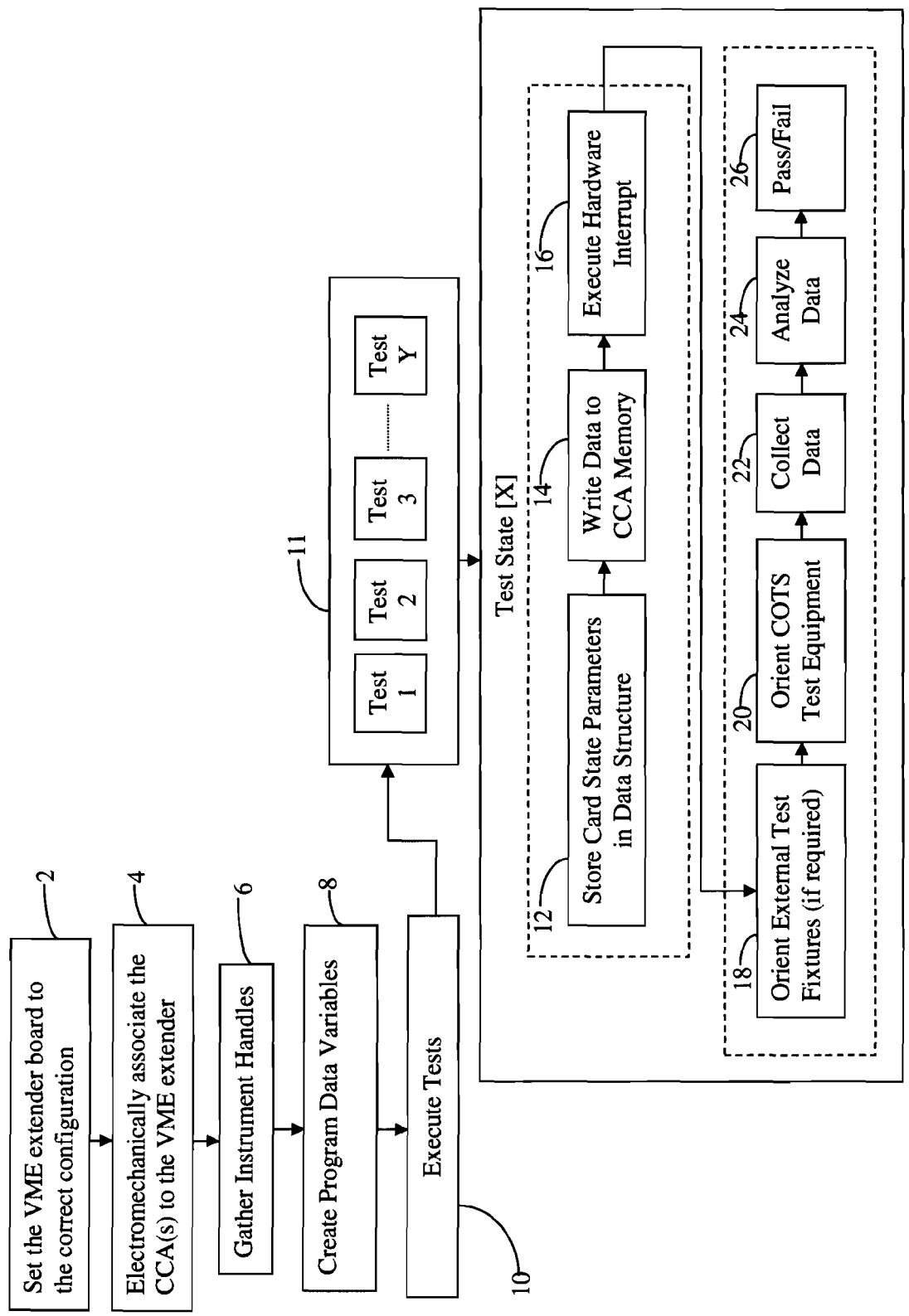

METHOD FOR TESTING A CIRCUIT CARD ASSEMBLY

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a method of testing a Circuit Card Assembly (CCA).

BRIEF DESCRIPTION OF THE DRAWING

FIG. 1 is a high-level block diagram illustrating an embodiment of a method according to the principles of the invention.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION

The Modulator-Controller AN/ULQ-21(V) is a digital, fully computer-controlled and programmable electronic countermeasures system of interchangeable modules operating primarily in the 2 to 18 GHz frequency range. It is constructed for multipurpose use in sub-scale targets, aircraft internal and external installations, laboratory applications, and land-based instrumentation sites. The AN/ULQ-21 is the primary system for Electronic Attack (EA) simulation for weapons test and evaluation (T&E) and operator training, providing a threat environment for both captive carry and live fire testing.

Embodiments of the invention can include, but not limited to, seven customized software controlled automated tests for commercial off the shelf electronic test equipment constructed to provide automated testing capabilities for the AN/ULQ-21(V) (Hydra) Countermeasures (CM) Set developed by the Airborne Threat Simulation Organization (ATSO) at the Naval Air Warfare Center Weapons Division (NAWCWD) in Point Mugu, Calif. Embodiments of the invention provide an automated method of performing Acceptance Test Procedures (ATP) on Hydra Circuit Card Assemblies (CCAs) that make up the Hydra Countermeasures Set. After a card successfully passes its program, combinations of these CCAs are assembled inside the Hydra to effectively simulate all currently observed and projected Airborne threat countermeasures that might be used against United States weapon systems.

With reference to FIG. 1, the user first sets the VersaModular Eurocard ("VME") extender board (a circuit board that, in conjunction with an electric bus, routes signals from the VME computer to the CCA) for the correct configuration 2, i.e., a desired configuration that best replicates the operational signal input/output in the AN/ULQ (Hydra) Countermeasures Set.

Next, at least one CCA is electromechanically associated with a VME extender board 4.

Embodiments of the invention include providing computer readable program code for verifying the existence and proper connection of COTS instrumentation 6. COTS test equipment includes a signal generator, an oscilloscope, a spectrum analyzer, and a Data Acquisition Device. Not all of the components that include COTS test equipment are used in every software controlled automated test. Therefore, the COTS test equipment that needs to be verified (as in step 6), and oriented (as in step 20), can vary depending on what test(s) (of the seven tests listed below) are run; the COTS test equipment that is used to run a test is verified (as in step 6) and oriented (as in step 20). See the description of each test (listed as Test 1, Test 2, Test 3, Test 4, Test 5, Test 6, Test 7 below) to determine what COTS test equipment is needed for each test.

Embodiments of the invention include providing computer readable program code to cause a variable declaration at the beginning of the program to tell the compiler (firmware) the name and type of a variable under which data will be stored 8. When creating and declaring program data variables, the variables are also initialized to a specific value. In some embodiments, variables are initialized to '0' or 'NULL' depending on data types. In other embodiments, variables are set to the min or max expected value for a measurement, thereby facilitating loop progression or algorithm initiation. The variables are initialized to a value that prevents: 1) the code from failing to compile; 2) memory leaks; 3) cause infinite loops; and 4) the code from failing to execute correctly. The software stored on the VME computer will write default test state parameters to memory locations on the CCA to prepare the CCA for testing. Default test state parameters were actually defined previously by a previously written Acceptance Test Procedure document. Then these values were simply hard-coded (written) into the automation code of the ATE software program. The cards' specifications and internal constructs were known so knowing min and max values of the performance specs helped incorporate these parameters into the ATP document. The specific card state parameters, including how much noise bandwidth to output or how many decibels to attenuate, are chosen to assess min, max, and within the min & max performance: Parameters at the spec's minimum performance were chosen, then parameters near the spec's minimum were chosen, then parameters in the middle of the spec's min & max were chosen, then parameters near the spec's maximum were chosen, then parameters at the maximum were chosen.

Embodiments of the invention further include controlling automated test equipment (ATE) to begin taking measurements of particular aspects of the CCAs 10. The software program transfers Standard Commands for Programmable Instruments (SCPI) commands across an IEEE 488 (GPIB) bus to remotely controlled equipment such as, for example, the Tektronix TDS3054B Digital Oscilloscope, Agilent 8563E Spectrum Analyzer, Anritsu 68369B Synthesized Signal Generator, located on different nodes on the GPIB bus. These commands cause the instrument to be configured in suitable testing states. More SCPI commands are sent to the instruments from the software stored on the VME computer to allow the instrument to begin collecting data points at precise physical locations of the CCAs and at specific CCA operational moments. Once data is collected on the instrument, subsequent command queues are sent by the software program to return relevant data to the program stored on the VME computer across the GPIB bus. The measurement data is conditioned, formatted and stored in Global and Local variables in the program stored on the VME computer.

With reference to FIG. 1, the "Setup the CCA" block can be described as a sub-process that commands the CCA to operate under certain parameters, including the following sub-blocks: 1) storing card state parameters in data structure 12; 2) writing data to CCA memory 14; and 3) executing hardware interrupt 16.

The first sub-block 12 involves storing preset card state parameters in data structures. A data structure is a collection of one or more variables grouped under a single name for easy manipulation. The variables in a structure, unlike those in an array, can be of different data types. Each variable within a structure is a member. The act of defining a structure allocates system memory for all its members in locations on the ATE CPUs memory stack. The first sub-block describes storing operational CCA state parameters in data structure, to be translated into machine data (hexadecimal values) later used to set the CCA under test into a defined operational test state.

The next sub-block in the Setup the CCA block 14—writing data to the CCA memory—describes writing stored card state parameters to the CCA memory.

The next sub-block in the Setup the CCA block 16, (executing hardware interrupt), describes writing a microcontroller interrupt request to a CCA memory location so that the CCA will interrupt whatever it is doing to service the request and act upon the hardware interrupt it was sent, thus enacting a certain state.

With reference to FIG. 1, the Test the CCA block involves orienting external test fixtures, orienting COTS test equipment, and collecting and analyzing data, i.e., captured CCA output jamming waveforms and/or other measurements or information as described in this Detailed Description. Each of the tests described below can be run with different parameters, including expected voltage . . . etc. Any one or more of the tests 11 described below (listed as Test 1 . . . Test 7) may be performed, and if more than one test is performed, the tests can be performed in any order.

The first sub-block in the Test the CCA block 18 (Orienting external test fixtures), describes how the Hydra ATE program will send commands to external fixtures including the National Instruments DAQPad 6508 and National Instruments ER-16 Relay Unit that will drive control relays and switches, enabling measurement lines to be multiplexed to remotely controlled equipment.

The next sub-block in the Test the CCA block 20 (Orient COTS test equipment), describes sending SCPI commands to remotely controlled instruments including the Tektronix TDS3054B Digital Oscilloscope, Agilent 8563E Spectrum Analyzer, and Anritsu 68369B Synthesized Signal Generator to allow measurement signals to be properly viewed on the remote controlled instruments and characterized by the software program.

For each test performed, instructions are provided to cause the VME computer to control COTS equipment (or perform some other task as described in the description of each Test below) measurements/information/data is/are taken and stored (on VME computer), i.e., collected for analysis.

The captured CCA output jamming waveforms and/or other measurements/information/data as described in this Detailed Description are analyzed by the ATE Software Programs by comparing the measurement data against a database of known specifications of the CCA. CCA timing output diagrams and discrete data points of collected measurements are verified for consistency and within acceptable percent errors of programmed parameters.

Test 1

The instructions of one test type cause a VME computer test all digital phase shifting bits by analyzing RF output jamming waveforms. The instructions cause a spectrum analyzer to capture the center of frequency, peak amplitude, movement of peaks and quantity of peaks; the instructions cause the VME computer to collect the measurements from the spectrum analyzer 22. The instructions cause the software program on the VME computer to analyze the captured data to determine when they fall within a predetermined percent error of operating specifications 24.

Test 2

The instructions of another test type cause a CCA to output a RF waveform to a spectrum analyzer; the instructions cause the VME computer to capture the RF jamming bandwidth, attenuation and center frequency of the waveform 22. The instructions cause the VME computer to analyze the captured data to determine when they fall within a predetermined percent error of operating specifications 24.

Test 3

The instructions of another test type cause the VME computer to test all relevant CCA outputs across the VersaModular Eurocard bus ("VMEBus"), which are mainly transistor-transistor logic (TTL) switch signals designed to toggle RF Pin Diode RF modulation switches. The instructions cause the VME computer to request or queue the oscilloscope for the measurement it wants, i.e., voltage, amplitude, pulse repetition frequency, etc.; the oscilloscope responds and the instructions cause the VME computer to collect and store the measurement in an appropriate variable on VME computer 22. The instructions cause the computer to analyze the measurement to determine when the measurement falls within a predetermined percent error of operating specifications 24.

Test 4

The instructions of another test type are used to test all relevant CCA industry standard communication input/output lines. The software program instructions cause the VME computer to request or queue the CCA to write communication signals to the VME computer. The CCA will output electrical signals (in some embodiments a word or plurality of words) that need to be deciphered and that are collected by the VME computer 22. The software program instructions cause a computer to determine whether the CCA output electrical signal(s) are decipherable, and match the electrical signals requested 24. When the CCA-output electrical signal(s) are decipherable and match the electric signals requested, the test is passed—otherwise it is failed. The software will identify errors and discrepancies to the tester after it is executed, expediting future circuit card troubleshooting.

Test 5

The instructions for yet another test type will cause the VME computer to automatically upload an operating system, such as, for example, the Hydra Have All Embedded Real Time Operating System, into the Commercial-Off-the-Shelf (COTS) CCA's onboard non-volatile memory. The software instructions will cause the CCA to execute a programmatic boot sequence that will load other pertinent operating system files into non-volatile memory; the instructions will cause the VME computer to serially monitor the booting process and collect data regarding the booting process 22. The instructions will cause the VME computer to determine whether the booting process went as determined in a predetermined booting process 24.

Test 6

The instructions for yet another test type are used to test all digital output modulation signals coming from the Pulse IV CCA and subsequently test all RF emitter output from the Integrated Stabilized RF (ISRF) Source Line Replaceable Unit (LRU). The instructions cause an oscilloscope to measure the pulse width, pulse repetition frequency, and pulse repetition interval; the instructions cause the VME computer to collect the measurements 22. The instructions will cause the VME computer to analyze the data measured by the oscilloscope to determine whether the measured data falls within a predetermined percent error of operating specifications 24. The instructions also cause a signal generator to provide a RF signal into the CCA, which will cause the CCA to react. The reactions are measured by an oscilloscope and DAQPad 6508; the instructions cause the computer to collect the measurements 22. The instructions cause the computer to compare the measurements to a predetermined percent error of operating specifications. The instructions also cause a spectrum analyzer to measure the center frequency and amplitude; the instructions cause a VME computer to queue the remote instruments for measurement values and send data across the GPIB bus. 22. The instructions then cause the VME computer to analyze the collected measurement(s) to determine whether it falls within a predetermined percent error of operating specifications 24.

Test 7

The instructions for yet another test type is used to calibrate circuitry for many of the onboard electronic components on the CCA such as the Digital Log Video Amplifier, Analog to Digital Converters (ADCs), and Digital to Analog Converters (DACs) and write hexadecimal power tables into memory. The instructions cause the VME computer to remotely control the signal generator and cause the signal generator to output a power signal; the instructions then cause the CCA to measure the power signal output by the signal generator and store it in CCA onboard memory such that when the same power signal is received by the CCA when it use, the CCA will associate the power signal with a designated power level 22. The instructions for this test type also check three telemetry lines of the CCA. The instructions will cause the signal generator to output a signal which is received by the CCA. The CCA responds by outputting a TTL signal(s), which are measured by an oscilloscope; the instructions cause the VME computer to retrieve the voltage value measured by the oscilloscope 22. The instructions cause the VME computer to compare the measurement to a table of specifications to determine whether output power levels are within some pre-determined percent error of the specification value 24. The ATE software will verify correct RF Peak and Average power representations are written in hexadecimal to appropriate volatile memory locations.

After the data is analyzed, a pass or fail indicator in the form a green (successful) or red (unsuccessful) highlighted text for each test run is displayed to the user at the end of the automated tests 26. Pass or fail states are written to a log file located on the Hydra ATE Software Program host computer, and are displayed on the Hydra ATE session log on the main GUI page.

In some embodiments, a detailed operability status of the CCAs is displayed to the user. Software utilizes a VME protocol to read back CCA stored data in memory and displays it to the user in translated, easy to interpret status messages. The software utilizes a VME protocol to read back CCA stored data in Dual Port SRAM memory address and outputs raw data organized into a hexadecimal and ASCII translated table.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of testing a circuit card assembly (CCA) comprising:
    connecting an extender board to a CCA, said CCA having CCA memory;
    providing computer readable program code to cause a computer to verify the existence and connection of instrumentation;
    providing computer readable program code to cause a variable declaration to inform an electronic compiler a name and associated type of variable that data will be stored under;
    providing computer readable program code to cause said computer to store CCA card state parameters in a data structure;
    providing computer readable program code to cause said computer to write data to said CCA memory;
    providing computer readable program code to cause said computer to perform a hardware interrupt;
    providing computer readable program code to cause said computer to orient external test fixtures;
    providing computer readable program code to cause said computer to orient test equipment;
    providing computer readable program code to cause said test equipment to measure at least one aspect of CCA functionality; and
    providing computer readable program code to cause said computer to analyze said measurement of said at least one aspect of CCA functionality to determine whether it falls within a predetermined percent error of operating specifications.

2. The method of testing a circuit card assembly of claim 1 further comprising:
    providing computer readable program code to cause said computer to activate a pass or fail indicator for each measurement analyzed, said indicator will indicate a pass when said at least one CCA functionality is determined to fall within said predetermined percent error and said indicator will indicate a fail when said at least one CCA functionality is determined to not fall within said predetermined percent error; and
    providing computer readable program code to cause said computer to write said pass or fail state to a log file located on said computer.

3. The method of testing a circuit card assembly of claim 1 wherein said providing computer readable program code to cause said test equipment to measure at least one aspect of CCA functionality comprises providing computer readable program code to cause a spectrum analyzer to measure at least one aspect of CCA functionality selected from the group consisting of the center of frequency, peak amplitude, movement of peaks, and quantity of peaks.

4. The method of testing a circuit card assembly of claim 3 further comprising:
    providing computer readable program code to cause said computer to activate a pass or fail indicator for each measurement analyzed, said indicator will indicate a pass when said at least one CCA functionality is determined to fall within said predetermined percent error and said indicator will indicate a fail when said at least one CCA functionality is determined to not fall within said predetermined percent error; and
    providing computer readable program code to cause said computer to write said pass or fail state to a log file located on said computer.

5. The method of testing a circuit card assembly of claim 1 wherein said providing computer readable program code to cause said test equipment to measure at least one aspect of CCA functionality comprises providing computer readable program code to cause a spectrum analyzer to capture the RF jamming bandwidth, attenuation, and center frequency.

6. The method of testing a circuit card assembly of claim 5 further comprising:
   providing computer readable program code to cause said computer to activate a pass or fail indicator for each measurement analyzed, said indicator will indicate a pass when said at least one CCA functionality is determined to fall within said predetermined percent error and said indicator will indicate a fail when said at least one CCA functionality is determined to not fall within said predetermined percent error; and
   providing computer readable program code to cause said computer to write said pass or fail state to a log file located on said computer.

7. The method of testing a circuit card assembly of claim 1 wherein said providing computer readable program code to cause said test equipment to measure at least one aspect of CCA functionality comprises providing computer readable program code to cause an oscilloscope to measure voltage of analog or digital input/output lines of said CCA.

8. The method of testing a circuit card assembly of claim 7 further comprising:
   providing computer readable program code to cause said computer to activate a pass or fail indicator of each measurement analyzed, said indicator indicating a pass when said voltage of input/output lines of said CCA is determined to fall within said predetermined percent error and said indicator will indicate a fail when said voltage of input/output lines of said CCA is determined to not fall within said predetermined percent error; and
   providing computer readable program code to cause said computer to write said pass or fail state to a log file located on said computer.

9. The method of testing a circuit card assembly of claim 1 wherein said test equipment comprises a signal generator, an oscilloscope, a spectrum analyzer, and a Data Acquisition Device, and wherein said providing computer readable program code to cause said test equipment to measure at least one aspect of CCA functionality step comprises:
   providing computer readable program code to cause an oscilloscope to measure pulse width, pulse repetition frequency, and pulse repetition interval of analog output lines physically located on a Bus of said CCA;
   providing computer readable program code to cause said signal generator to provide an RF signal into said CCA causing said CCA to react;
   providing computer readable program code to cause said oscilloscope and said Data Acquisition Device to measure said reaction(s); and
   providing computer readable program code to cause said spectrum analyzer to capture the center frequency and peak amplitude of Radio Frequency Output connectors of said CCA.

10. The method of testing a circuit curd assembly of claim 9 further comprising:
    providing computer readable program code to cause said computer to activate a pass or fail indicator for each measurement analyzed, said indicator will indicate a pass when said at least one CCA functionality is determined to fall within said predetermined percent error and said indicator will indicate a fail when said at least one CCA functionality is determined to not fall within said predetermined percent error; and
    providing computer readable program code to cause said computer to write said pass or fail state to a log file located on said computer.

11. The method of testing a circuit card assembly of claim 1 wherein said test equipment comprises a signal generator and an oscilloscope, and wherein said providing computer readable program code to cause said test equipment to measure at least one aspect of CCA functionality comprises:
    providing computer readable program code to cause said computer to remotely control said signal generator and cause said signal generator to output a power signal;
    providing computer readable program code to cause said CCA to measure said power signal output by said signal generator and store it in said CCA memory such that when the same power signal is received by said CCA when in practice, said CCA will associate the power signal received in practice with a designated power level;
    providing computer readable program code to cause said signal generator to output a signal which is received by said CCA, causing said CCA to output a Transistor-Transistor Logic ("TTL") signal(s), which are measured by an oscilloscope; and
    providing computer readable program code to cause said computer to retrieve said voltage value measured by the oscilloscope and compare said voltage value to a table of specifications to determine whether output power levels are within a pre-determined percent error of a specification value.

12. The method of testing a circuit card assembly of claim 11 further comprising:
    providing computer readable program code to cause said computer to activate a pass or fail indicator, said indicator will indicate a pass when said computer determines that said measured output power level(s) is within a pre-determined percent error of the specification value and said indicator will indicate a fail when said computer determines that measured output power level(s) is not within a pre-determined percent error of the specification value; and
    providing computer readable program code to cause said computer to write said pass or fail state to a log file located on said computer.

13. A method of testing a circuit card assembly ("CCA") comprising:
    connecting an extender board to a CCA;
    providing computer readable program code to cause a computer to verify the existence and connection of instrumentation;
    providing computer readable program code to cause a variable declaration to inform an electronic compiler a name and associated type of variable that data will be stored under;
    providing computer readable program code to cause said computer to store CCA card state parameters in a data structure;
    providing computer readable program code to cause said computer to write data to CCA memory;
    providing computer readable program code to cause said computer to perform a hardware interrupt;
    providing computer readable program code to cause said computer to orient external test fixtures;
    providing computer readable program code to cause said computer to orient test equipment;
    providing computer readable program code to cause said computer to upload an operating system into the CCA's onboard non-volatile memory, causing said CCA to execute a programmatic boot sequence that will load other pertinent operating system files into non-volatile memory;

providing computer readable program code to cause said computer to serially monitor the booting process; and providing computer readable program code to cause said computer to determine whether said booting process went as expected.

14. The method of testing a circuit card assembly of claim 13 further comprising:

providing computer readable program code to cause said computer to activate a pass or fail indicator, said indicator will indicate a pass when said computer determines that said booting process ran as expected and said indicator will indicate a fail when said computer determines that said booting process did not run as expected; and providing computer readable program code to cause said computer to write said pass or fail state to a log file located on said computer.

15. A method of testing a circuit card assembly ("CCA") comprising:

connecting an extender board to a CCA;

providing computer readable program code to cause a computer to verify the existence and connection of instrumentation;

providing computer readable program code to cause a variable declaration to inform an electronic compiler a name and associated type of variable that data will be stored;

providing computer readable program code to cause said computer to store CCA card state parameters in a data structure;

providing computer readable program code to cause said computer to write data to CCA memory;

providing computer readable program code to cause said computer to perform a hardware interrupt;

providing computer readable program code to cause said computer to orient external test fixtures;

providing computer readable program code to cause said computer to orient test equipment;

providing computer readable program code to cause said computer to prompt said CCA to output pre-determined electrical signals;

providing computer readable program code to cause said computer to record electrical signals output by said CCA in response to said computer asking said CCA to output pre-determined electrical signals; and providing computer readable program code to cause said computer to determine whether said CCA output electrical signals are decipherable and match the electrical signals requested.

16. The method of testing a circuit card assembly of claim 15 further comprising:

providing computer readable program code to cause said computer to activate a pass or fail indicator after said computer has determined whether said CCA output electrical signals are decipherable and match the electrical signals requested, said indicator will indicate a pass when said computer has determined that said CCA output electrical signals are decipherable and match the electrical signals requested and said indicator will indicate a fail when said computer has determined that said CCA output electrical signals are not decipherable and do not match the electrical signals requested; and providing computer readable program code to cause computer to write said pass or fail state to a log file located on said computer.

* * * * *